United States Patent
You et al.

(10) Patent No.: US 10,650,602 B2
(45) Date of Patent: May 12, 2020

(54) APPARATUS AND METHOD FOR THREE-DIMENSIONAL INFORMATION AUGMENTED VIDEO SEE-THROUGH DISPLAY, AND RECTIFICATION APPARATUS

(71) Applicant: Center of Human-centered Interaction for Coexistence, Seoul (KR)

(72) Inventors: Bum-Jae You, Seoul (KR); Juseong Lee, Seoul (KR)

(73) Assignee: CENTER OF HUMAN-CENTERED INTERACTION FOR COEXISTENCE, Seoul (KR)

( * ) Notice: Subject to any disclaimer, the term of this patent is extended or adjusted under 35 U.S.C. 154(b) by 0 days.

(21) Appl. No.: 16/093,860

(22) PCT Filed: Apr. 12, 2017

(86) PCT No.: PCT/KR2017/003973
§ 371 (c)(1),
(2) Date: Oct. 15, 2018

(87) PCT Pub. No.: WO2017/179912
PCT Pub. Date: Oct. 19, 2017

(65) Prior Publication Data
US 2019/0080517 A1    Mar. 14, 2019

(30) Foreign Application Priority Data

Apr. 15, 2016 (KR) .......................... 10-2016-0046176
Apr. 12, 2017 (KR) .......................... 10-2017-0047277

(51) Int. Cl.
*G06T 19/00* (2011.01)
*G06T 7/55* (2017.01)
(Continued)

(52) U.S. Cl.
CPC ........ *G06T 19/006* (2013.01); *G02B 27/0172* (2013.01); *G06T 7/55* (2017.01);
(Continued)

(58) Field of Classification Search
CPC .................................................... G06T 19/006
(Continued)

(56) References Cited

U.S. PATENT DOCUMENTS 9,105,090 B2 *   8/2015   Haribhatt ................ G06T 5/006
2010/0260355 A1  10/2010  Muraoka et al.
(Continued)

FOREIGN PATENT DOCUMENTS

KR    10-2006-0041060 A    5/2006
KR    10-2015-0044488 A    4/2015

OTHER PUBLICATIONS

Hung, Son Ngnyen et al., "Real-time Stereo Rectification Using Compressed Look-up Table with Variable Breakpoint Indexing", IECON, Oct. 23, 2016, pp. 4814-4819, 2016—42nd Annual Conference of the IEEE Industrial Electronics Society, Florence, Italy.

*Primary Examiner* — Shivang I Patel
(74) *Attorney, Agent, or Firm* — Novick, Kim & Lee, PLLC; Sang Ho Lee

(57) ABSTRACT

A three-dimensional information augmented video see-through display device according to an exemplary embodiment of the present disclosure includes a camera interface module which obtains at least two real images from at least two camera modules, a rectification module which performs rectification on the at least two real images, a lens distortion correction module which corrects at least two composite images obtained by combining a virtual image to the at least two real images, based on a lens distortion compensation value indicating a value for compensating for a distortion of a wide angle lens for the at least two real images, and an (Continued)

image generation module which performs side-by-side image processing on the at least two composite images to generate a three-dimensional image for virtual reality VR or augmented reality AR.

20 Claims, 11 Drawing Sheets

(51) Int. Cl.
  *G02B 27/01* (2006.01)
  *G06T 7/593* (2017.01)
  *G06T 7/80* (2017.01)
(52) U.S. Cl.
  CPC ............... *G06T 7/593* (2017.01); *G06T 7/85* (2017.01); *G02B 2027/0178* (2013.01); *G06T 2200/08* (2013.01); *G06T 2207/10012* (2013.01); *G06T 2207/10024* (2013.01); *G06T 2207/10048* (2013.01)
(58) Field of Classification Search
  USPC ........................................................ 345/633
  See application file for complete search history.

(56) References Cited

U.S. PATENT DOCUMENTS

| | | | |
|---|---|---|---|
| 2011/0234584 A1* | 9/2011 | Endo | G02B 27/017 345/419 |
| 2015/0302648 A1 | 10/2015 | Zhang | |
| 2016/0191815 A1* | 6/2016 | Annau | H04N 5/247 348/38 |

* cited by examiner

X LUT stored in internal memory

| Address | Data | | | | |
|---|---|---|---|---|---|
| m | ... | ... | ... | ... | ... |
| m+5 | 00000 | ... | wasted memory | | |
| m+10 | 00000 | 01002 | ... | ... | ... |
| m+15 | 00001 | 00802 | 00803 | ... | ... |
| m+20 | 00002 | 01003 | ... | ... | ... |
| m+25 | 00001 | ... | ... | ... | ... |

FIG. 9A

Y LUT stored in internal memory

| Address | Data | | | | |
|---|---|---|---|---|---|
| n | ... | ... | ... | ... | ... |
| n+5 | 00000 | ... | wasted memory | | |
| n+10 | 00004 | 04001 | 04802 | 01803 | ... |
| n+15 | 00004 | ... | ... | ... | ... |
| n+20 | ... | ... | ... | ... | ... |
| n+25 | ... | ... | ... | ... | ... |

FIG. 9B

X LUT stored in internal memory

| Address | Data | | | | |
|---|---|---|---|---|---|
| m | ... | ... | ... | ... | ... |
| m+5 | 00000 | 00000 | 01002 | 00001 | 00802 |
| m+10 | 00803 | 00002 | 01003 | 00001 | ... |
| m+15 | 0 | 1 | 3 | 6 | 8 |
| m+20 | ... | ... | ... | ... | ... |
| m+25 | ... | ... | ... | ... | ... |

FIG. 10A

Y LUT stored in internal memory

| Address | Data | | | | |
|---|---|---|---|---|---|
| n | ... | ... | ... | ... | ... |
| n+5 | 00000 | 00004 | 04001 | 04802 | 01803 |
| n+10 | 00004 | ... | ... | ... | ... |
| n+15 | 0 | 1 | 5 | ... | ... |
| n+20 | ... | ... | ... | ... | ... |
| n+25 | ... | ... | ... | ... | ... |

FIG. 10B

| X coordinate - 18 bits encoded data ||||||||
|---|---|---|---|---|---|---|---|
| 17th | 16th | 15th | 14th | 13th | 12th | 11th | 10th - 0th |
| Double Target ||| Differential |||| Row number |

FIG. 11A

| Y coordinate - 18 bits encoded data ||||||||
|---|---|---|---|---|---|---|---|
| 17th | 16th | 15th | 14th | 13th | 12th | 11th | 10th - 0th |
| Consecutive ||| Differential |||| Column number |

FIG. 11B

| Double Target ||||
|---|---|---|---|
| Location | 3 bits encoded |||
| No Double Target | 0 | 0 | 0 |
| Up forward | 0 | 0 | 1 |
| Up | 0 | 1 | 0 |
| Up backward | 0 | 1 | 1 |
| Below forward | 1 | 0 | 0 |
| Below | 1 | 0 | 1 |
| Below backward | 1 | 1 | 0 |

FIG. 12

| Differential | | | | | |
|---|---|---|---|---|---|
| Sign | Value | 4 bits encoded | | | |
| + | 0 | 0 | 0 | 0 | 0 |
|  | 1 | 0 | 0 | 0 | 1 |
|  | ... | | | | |
|  | 6 | 0 | 1 | 1 | 0 |
|  | 7 | 0 | 1 | 1 | 1 |
| - | 1 | 1 | 0 | 0 | 0 |
|  | 2 | 1 | 0 | 0 | 1 |
|  | ... | | | | |
|  | 7 | 1 | 1 | 1 | 0 |
|  | 8 | 1 | 1 | 1 | 1 |

FIG. 13

| Consecutive information | | | |
|---|---|---|---|
| 3 bits encoded | | | Value |
| Flag | Differential for the next breakpoint | | |
| 1 | 0 | 0 | 0 |
| 1 | 0 | 1 | 1 |
| 1 | 1 | 1 | -1 |
| 0 | Don't care | Don't care | Don't care |

FIG. 14

APPARATUS AND METHOD FOR THREE-DIMENSIONAL INFORMATION AUGMENTED VIDEO SEE-THROUGH DISPLAY, AND RECTIFICATION APPARATUS

CROSS-REFERENCE TO RELATED APPLICATIONS

This application claims the benefits of Korean Patent Application Nos. 10-2016-0046176 and 10-2017-0047277 filed on Apr. 15, 2016 and Apr. 12, 2017, respectively, in the Korean Intellectual Property Office, the disclosure of which is incorporated herein by reference.

BACKGROUND

Field

Exemplary embodiments of the present disclosure relate to a three-dimensional information augmented video see-through display device and method, and a rectification apparatus therefor.

Description of the Related Art

A head mounted display (hereinafter, abbreviated as HMD) device is a next-generation image display device which is worn on the head like a pair of glasses to view images and is used to view a large-size screen or perform operations or diagnosis while carrying it. The HMD of the related art is utilized for special purposes such as military or training purposes. However, as the size and the weight of the HMD are reduced in accordance with the recent development of the display technology, low-priced HMDs are being commercially utilized. Although such low-priced HMDs have been mainly used to watch 3D movies, the HMDs are actively researched and developed as visualization devices of virtual reality and augmented reality by multiplying the technical characteristics capable of providing high intrusiveness.

The video see-through HMD is a device which is equipped with a camera in front thereof to allow a user to view the real world through the HMD. A real-world image (real image) obtained through a camera is converted into a digital signal and then the digital signal is visualized by the HMD. By doing this, the user views the front real world as a digital image.

The video see-through HMD provides several benefits: first, information which cannot be seen with naked eyes, such as infrared rays, ultraviolet rays, ultrasonic waves, and electronic waves, can be visually identified with naked eyes using a special camera. Further, when a zoom-in function of the camera is used, objects at a long distance can be magnified several times to several tens of times. Further, when a fish-eye lens is mounted in a camera, a viewing angle is significantly widened to provide a full field of view.

Second, the video see-through HMD may store the front field of view which is watched by the user as a stereoscopic image as it is. Image information stored as described above can be shared by other people through a network and the user can view the image again in the future. The user can reproduce/share the experience beyond the time and space constraints by storing the visual experience.

Third, the video see-through HMD also provides protection for the user's eyes from the danger which may cause damages on the vision, such as sunlight, laser, trashes, and hazardous materials. A visual experience sharing system which can be practically used in the near future can be allowed by providing a new information service utilizing a network means including a video see-through HMD, wireless visual communication, and Internet. Therefore, among various benefits which can be obtained using the video see-through HMD, it is required to develop a technology of a smooth information service which enables the sharing of the visual experience.

With regard to this, there is Korean Unexamined Patent Application Publication No. 10-2015-0044488 entitled "Video see-through head mounted display video contents operating method and system".

SUMMARY

An object to be achieved by the present disclosure is to provide a three-dimensional information augmented video see-through display device and method which generate a three-dimensional image for virtual reality or augmented reality by a video see-through manner by processing an image obtained from a plurality of camera modules into a three-dimensional image in a module implemented by a hardware chip without using a PC.

Further, another object to be achieved by the present disclosure is to reduce a storage space of a break point look-up table by sequentially storing a plurality of break point information for rectification in an empty space on the break point look-up table.

Moreover, still another object to be achieved by the present disclosure is to perform the rectification by previously storing a differential value between a next target coordinate to which a next coordinate conversion target pixel group is converted and a current target coordinate in current coordinate conversion information for rectification to minimize access to the break point look-up table.

Technical problems of the present disclosure are not limited to the above-mentioned technical problem(s), and other technical problem(s), which is (are) not mentioned above, can be clearly understood by those skilled in the art from the following descriptions.

According to an aspect of the present disclosure, a three-dimensional information augmented video see-through display device includes a camera interface module which obtains at least two real images from at least two camera modules, a rectification module which performs rectification on the at least two real images, a lens distortion correction module which corrects at least two composite images obtained by combining a virtual image to the at least two real images, based on a lens distortion compensation value indicating a value for compensating for a distortion of a wide angle lens for the at least two real images, and an image generation module which performs side-by-side image processing on the at least two composite images to generate a three-dimensional image for virtual reality or augmented reality.

According to an exemplary embodiment, the rectification module determines a current coordinate conversion target pixel group configured by at least one consecutive pixel requiring the same coordinate conversion, among a plurality of pixels included in at least two real images, based on current reference target break point information on a previously stored break point look-up table and converts the coordinate of the current coordinate conversion target pixel group based on current coordinate conversion information including a current differential value which is a differential value from the current target coordinate to which the current coordinate conversion target pixel group is converted.

For example, the previously stored break point look-up table sequentially stores the plurality of break point information in an empty space on the memory and further stores storage address information on at least one memory for at least one break point information among the plurality of sequentially stored break point information.

For example, the current coordinate conversion information previously stores the different value between the next differential value which is a differential value from the next target coordinate which is a coordinate to which the next coordinate conversion target pixel group previously determined based on the next reference target break point information on the previously stored break point look-up table is converted and the current differential value.

For example, the rectification module converts the coordinate of the next coordinate conversion target pixel group based on a different value between the next differential value and the current differential value.

According to an exemplary embodiment, when at least two camera modules are fish-eye cameras, the differential field indicating a current differential value includes at least four bits.

According to an exemplary embodiment, the three-dimensional information augmented video see-through display device further includes: at least two camera modules which photograph the at least two real images, an IR camera module which photographs an IR image, and a camera calibration module which performs camera calibration for the at least two camera modules based on the IR image to enhance an image processing reliability for the at least two real images.

For example, the three-dimensional information augmented video see-through display device further includes a lighting sensing module which detects a lighting location within a predetermined radius from a current location and a spatial sense generation module which generates direction data for every lighting with respect to the current location based on the detected lighting location and the virtual image is input from a computer interworking with the three-dimensional information augmented video see-through display device to be combined with the at least two real images and the computer assigns a shadow effect to an object in the virtual image based on the generated direction data.

For example, the lighting sensing module further detects a luminous intensity of each lighting for every lighting location and when the shadow effect is assigned, the computer adjusts a depth of the shadow of the object in the virtual image based on the detected luminous intensity.

For example, the three-dimensional information augmented video see-through display device further includes a microphone module which detects a sound generated within a predetermined radius from the current location and a communication module which transmits the detected sound to a predetermined sound transmitting target.

According to an exemplary embodiment, the three-dimensional information augmented video see-through display device further includes a spatial sense generation module which generates direction data of the sound detected by a plurality of microphone modules, based on an oriented angle of direction of the plurality of microphone modules when the plurality of microphone modules is provided and the communication module further transmits the generated direction data to the sound transmitting target.

For example, the three-dimensional information augmented video see-through display device further includes a lens distortion compensation look-up table which stores the lens distortion compensation value matched to each of a plurality of display devices and the lens distortion correction module corrects the at least two composite images using the lens distortion compensation look-up table.

According to an exemplary embodiment, at least one of the camera interface module, the rectification module, the lens distortion correction module, and the image generation module is implemented by a hardware chip.

According to another aspect of the present disclosure, a three-dimensional information augmented video see-through display method includes obtaining at least two real images from at least two camera modules, performing rectification on the at least two real images, correcting at least two composite images obtained by combining a virtual image to the at least two real images, based on a lens distortion compensation value indicating a value for compensating for a distortion of a wide angle lens for the at least two real images, and performing side-by-side image processing on the at least two composite images to generate a three-dimensional image for virtual reality or augmented reality.

For example, the performing of rectification includes determining a current coordinate conversion target pixel group configured by at least one consecutive pixel requiring the same coordinate conversion, among a plurality of pixels included in at least two real images, based on current reference target break point information on a previously stored break point look-up table and converting the coordinate of the current coordinate conversion target pixel group based on current coordinate conversion information including a current differential value which is a differential value from the current target coordinate to which the current coordinate conversion target pixel group is converted.

According to an exemplary embodiment, the current coordinate conversion information previously stores the different value between the next differential value which is a differential value from the next target coordinate which is a coordinate to which the next coordinate conversion target pixel group previously determined based on the next reference target break point information on the previously stored break point look-up table is converted and the current differential value.

For example, the performing of rectification includes converting the coordinate of the next coordinate conversion target pixel group based on a different value between the next differential value and the current differential value.

For example, the three-dimensional information augmented video see-through display method further includes detecting a lighting location within a predetermined radius from a current location, generating direction data for every lighting with respect to the current location, based on the detected lighting location, and assigning a shadow effect to an object in the virtual image based on the generated direction data.

According to an exemplary embodiment, the three-dimensional information augmented video see-through display method further includes storing the lens distortion compensation value corresponding to each of a plurality of display devices in a lens distortion compensation look-up table and the correcting includes correcting the at least two composite images using the lens distortion compensation look-up table.

According to still another aspect of the present disclosure, a rectification apparatus includes a camera interface module which obtains at least two real images from at least two camera modules and a rectification module which performs rectification on the at least two real images and the rectification module determines a current coordinate conversion target pixel group configured by at least one consecutive pixel requiring the same coordinate conversion, among a plurality of pixels included in at least two real images, based on current reference target break point information on a previously stored break point look-up table and converts the coordinate of the current coordinate conversion target pixel group based on current coordinate conversion information including a differential value from the current target coordinate to which the current coordinate conversion target pixel group is converted.

Specific items of other embodiments are included in the detailed description and the drawings.

According to an exemplary embodiment of the present disclosure, three-dimensional image processing is performed on images obtained from a plurality of camera modules by a module implemented by a hardware chip without using a PC to generate a three-dimensional image for virtual reality or augmented reality by a video see-through manner.

According to an exemplary embodiment of the present disclosure, when the surroundings of the user are dark, camera calibration for a stereoscopic camera is performed using an IR image photographed by an IR camera module so that the sharpness of the image photographed by the stereoscopic camera is enhanced to improve the image processing reliability thereof.

According to an exemplary embodiment of the present disclosure, rectification is performed on images photographed by a plurality of camera modules so that the plurality of photographed images is changed to images as if the images are photographed by cameras aligned on the same column, thereby providing high quality images.

According to an exemplary embodiment of the present disclosure, in consideration of different distorted degrees of wide angle lenses for each of the plurality of video see-through display devices, a lens distortion of the wide angle lens for every display device is corrected using a lens distortion compensation look-up table, thereby achieving an effect of applying an opposite distortion to the image incident through the wide angle lens to improve the image quality.

According to an exemplary embodiment, the surrounding lighting location and a luminous intensity of lighting for every lighting location are detected by a lighting sensing module such as CDS and a shadow effect is assigned to a virtual image to be combined with a photographed image (real image) using the detecting result, thereby generating a more vibrant three-dimensional image.

According to an exemplary embodiment of the present disclosure, surrounding sound and an angle of direction of the sound are detected by a microphone module and the sound having a directivity is transmitted to the other party using the detecting result to allow the other party to more vibrantly feel the atmosphere of the scene.

According to an exemplary embodiment of the present disclosure, the three-dimensional information augmented video see-through display device may be detachably mounted in various display devices by being fastened with a mounting base and a cover.

According to an exemplary embodiment of the present disclosure, a storage space of a break point look-up table may be reduced by sequentially storing a plurality of break point information for rectification in an empty space on the break point look-up table.

According to an exemplary embodiment of the present disclosure, the rectification is performed by previously storing a differential value between a next target coordinate to which a next coordinate conversion target pixel group is converted and a current target coordinate in current coordinate conversion information for rectification to minimize access to the break point look-up table.

BRIEF DESCRIPTION OF THE DRAWINGS

The above and other aspects, features and other advantages of the present disclosure will be more clearly understood from the following detailed description taken in conjunction with the accompanying drawings, in which:

FIGS. 9A and 9B are views for explaining a break point look-up table utilized in a rectification algorithm of the related art;

FIGS. 10A and 10B are views for explaining a break point look-up table utilized in a step of performing rectification of a three-dimensional information augmented video see-through display method according to an exemplary embodiment of the present disclosure;

FIGS. 11A and 11B are views for explaining current coordinate conversion information utilized in a step of performing rectification of a three-dimensional information augmented video see-through display method according to an exemplary embodiment of the present disclosure;

FIG. 12 is a view for explaining a double target field among current coordinate conversion information utilized in a step of performing rectification of a three-dimensional information augmented video see-through display method according to an exemplary embodiment of the present disclosure;

FIG. 13 is a view for explaining a differential field among current coordinate conversion information utilized in a step of performing rectification of a three-dimensional information augmented video see-through display method according to an exemplary embodiment of the present disclosure; and FIG. 14 is a view for explaining a consecutive information field which defines a next target coordinate, among current coordinate conversion information utilized in a step of performing rectification of a three-dimensional information augmented video see-through display method according to an exemplary embodiment of the present disclosure.

DETAILED DESCRIPTION OF THE PREFERRED EMBODIMENT

Figure 1:
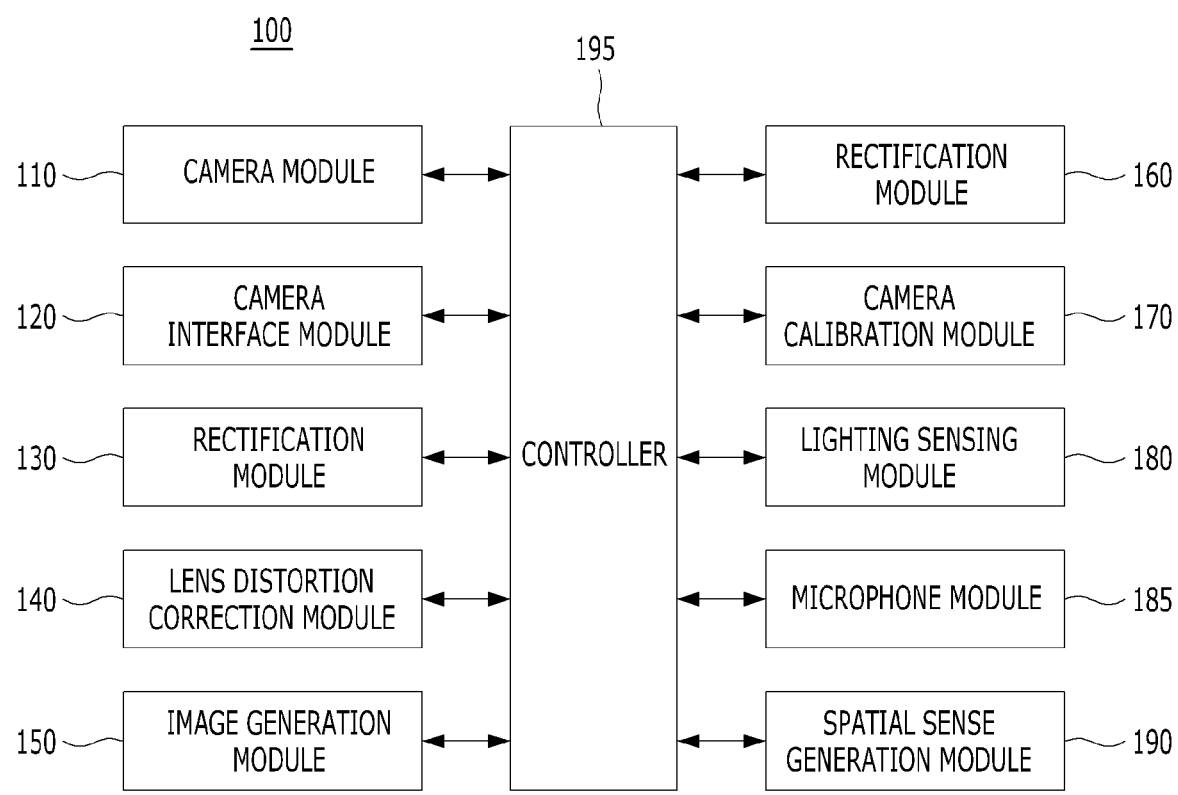
FIG. 1 is a block diagram for explaining a three-dimensional information augmented video see-through display device according to an exemplary embodiment of the present disclosure.

Advantages and characteristics of the present disclosure and/or a method of achieving the advantages and characteristics will be clear by referring to exemplary embodiments described below in detail together with the accompanying drawings. However, the present disclosure is not limited to the following exemplary embodiments but may be implemented in various different forms. The exemplary embodiments are provided only to complete the disclosure of the present disclosure and to fully provide a person having ordinary skill in the art to which the present disclosure pertains with the category of the disclosure, and the present disclosure will be defined by the appended claims. Like reference numerals indicate like elements throughout the specification.

Hereinafter, exemplary embodiments of the present disclosure will be described in detail with reference to the accompanying drawings.

FIG. 1 is a block diagram for explaining a three-dimensional information augmented video see-through display device according to an exemplary embodiment of the present disclosure.

Referring to FIG. 1, a three-dimensional information augmented video see-through display device 100 according to an exemplary embodiment of the present disclosure includes a camera module 110, a camera interface module 120, a rectification module 130, a lens distortion correction module 140, an image generation module 150, a display module 160, a camera calibration module 170, a lighting sensing module 180, a microphone module 185, a spatial sense generation module 190, and a control unit 195.

The camera module 110 may include two camera modules for photographing two real images. That is, the camera module 110 may include a stereoscopic camera for photographing two real images which are images corresponding to a right eye and a left eye of the user. Therefore, two real images may be divided into a left image and a right image (partial areas are superimposed) with respect to a photographing target.

According to an exemplary embodiment, the real images may refer to photographed images in the visible ray region which are photographed by two camera modules.

The camera module 110 may include three camera modules. In this case, two camera modules are used as the above-described stereoscopic cameras and the remaining one camera module may be used to detect a depth of the image.

Further, the camera module 110 may include an IR camera module for photographing an IR image. The IR image may be used to enhance the image processing reliability of two real images when the surroundings are dark. That is, when the surroundings are dark, the IR camera module may be driven together with the stereoscopic cameras.

The camera interface module 120 obtains images from the camera module 110. That is, the camera interface module 120 obtains two real images from the stereoscopic camera module configured by two camera modules. Further, the camera interface module 120 obtains three real images from three camera modules. Alternatively, the camera interface module 120 may obtain two real images and an IR image from the stereoscopic module and the IR camera module.

Figure 2:
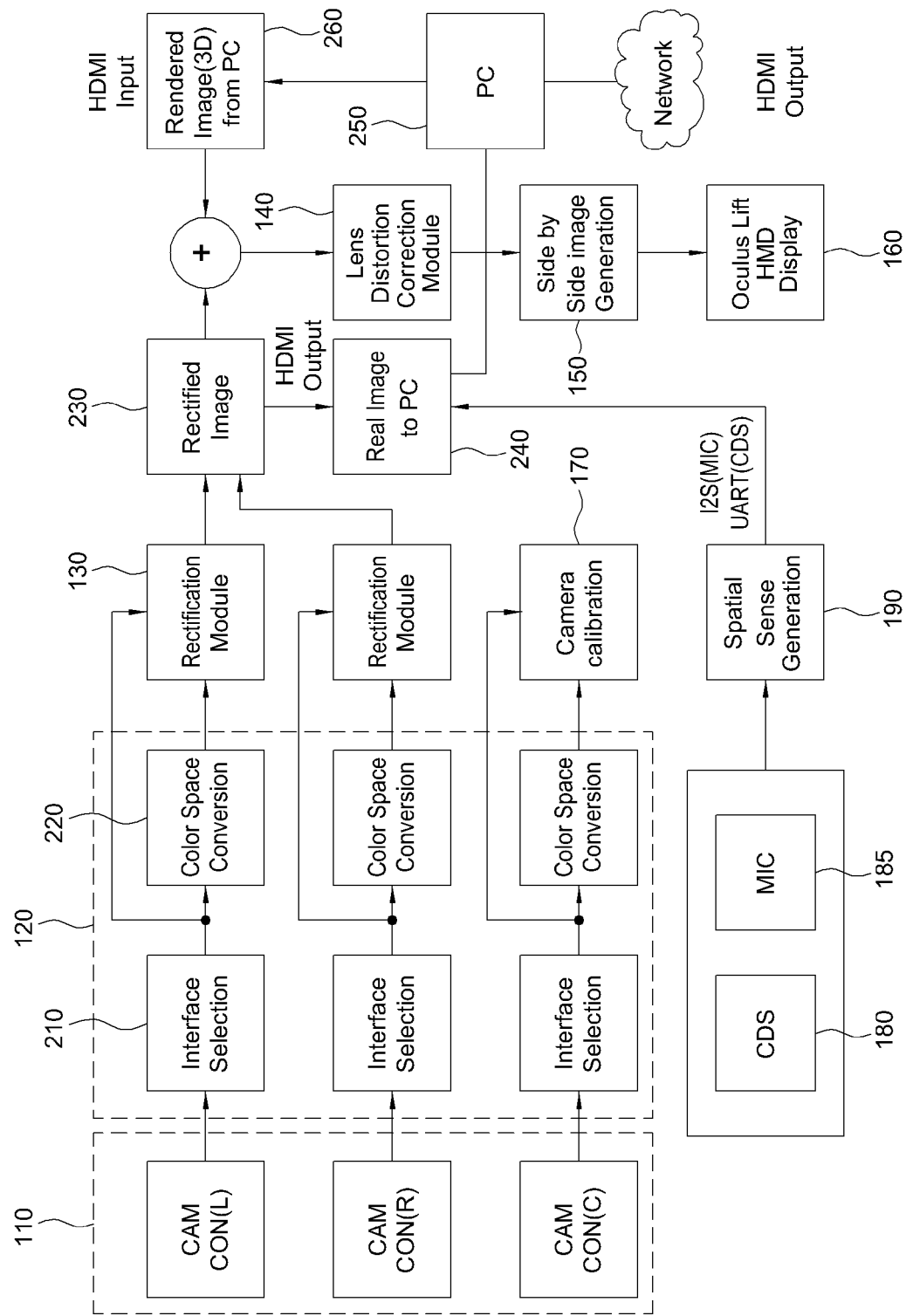
FIG. 2 is a view for explaining an operation of a three-dimensional information augmented video see-through display device according to an exemplary embodiment of the present disclosure.

To this end, the camera interface module 120 may include an interface selection module (see reference numeral 210 of FIG. 2) and a color space conversion module (see reference numeral 220 of FIG. 2). The interface selection module serves to select an interface appropriate for the corresponding camera by considering that the interfaces vary depending on cameras. The color space conversion module serves to convert a color signal into another color signal, for example, convert a YUV analog video into a digital RGB (red, green, and blue) video and convert the RGB into CMYK (cyan, magenta, yellow, and black). That is, the color space conversion module serves to convert an image input through the interface selection module into a format for image processing.

The rectification module 130 performs rectification on two real images. That is, the rectification module 130 may change two real images as if they are photographed from cameras aligned on the same column. For example, the rectification module 130 makes an optical axis and a reference point be parallel and intersect at infinity. Therefore, the scene superimposition may be maximized and the distortion may be minimized.

Therefore, in order to perform the rectification, a reference point is required. The rectification module 130 may extract a reference point from a chess board or a 3B object. The rectification module 130 may perform the rectification using an epipolar geometry. As described above, the rectification module 130 may correct an error (an alignment error of two cameras) of equipment by software to provide a high quality image.

According to an exemplary embodiment, the rectification module 130 determines a current coordinate conversion target pixel group configured by at least one consecutive pixel requiring the same coordinate conversion, among a plurality of pixels included in at least two real images, based on current reference target break point information on a previously stored break point look-up table and converts coordinates of the current coordinate conversion target pixel group based on the current coordinate conversion information including a current differential value which is a differential value from the current target coordinate which is a coordinate to which the current coordinate conversion target pixel group is converted.

In this case, the rectification module 130 will be described in more detail below with reference to FIGS. 8 to 14 and a redundant description will be omitted.

The lens distortion correction module 140 corrects two composite images obtained by combining a virtual image with two real images, based on a lens distortion compensation value representing a value for compensating for distortion of a wide angle lens for two real images (rectified images).

According to an exemplary embodiment, the lens distortion correction module 140 corrects two composite images obtained by combining a virtual image with two real images, based on a lens distortion compensation value representing a value for compensating for distortion of a wide angle lens for two rectified real images.

Specifically, since in the glass type display device such as a HMD, an interval between the eyes of the user and the lens is small, in order to widen a field of view, a wide angle lens is used. In this case, distortion is caused in an image incident through the wide angle lens. Therefore, in the exemplary embodiment, a lens distortion compensation value is applied to two composite images through the lens distortion correction module 140 so that opposite distortion is applied to the image incident through the wide angle lens to compensate for the distortion of the wide angle lens.

Here, the virtual image is input from a computer interworking with a three-dimensional information augmented video see-through display device 100 to be combined with two real images. The virtual image refers to a graphic image for providing virtual reality VR or augmented reality AR.

In the meantime, the glass type display device may have different lens distortion compensation values depending on a type or a model. For example, a HMD of a product A may have a larger distorted degree of the wide angle lens than that of a HMD of a product B. That is, each of the plurality of video see-through based display devices may have a different lens distortion compensation value. Therefore, in the exemplary embodiment, lens distortion compensation values corresponding to individual video see-through based display devices may be stored in a lens distortion compensation look-up table.

The lens distortion correction module 140 may correct two composite images using the lens distortion compensation look-up table. In other words, the lens distortion correction module 140 extracts a lens distortion compensation value matching the corresponding display device from the lens distortion compensation look-up table and corrects two composite images using the extracted lens distortion compensation value to have an opposite distortion.

The image generation module 150 performs side-by-side image processing on two composite images to generate a three-dimensional image for virtual reality VR or augmented reality AR. That is, the image generation module 150 performs an image processing task which converts two composite images which are divided into left and right images into one image having the same size to generate a three-dimensional image for virtual reality or augmented reality.

According to an exemplary embodiment, the side-by-side image processing is an algorithm for generating a three-dimensional image and sets two images to be disposed at left and right. A more specific description thereof will be omitted.

The display module 160 displays the generated three-dimensional image on a screen. Therefore, the user may view the three-dimensional image through the screen. However, in another exemplary embodiment, the display module 160 is not included in the three-dimensional information augmented video see-through display device 100, but may be implemented as an external display device.

The camera calibration module 170 may perform camera calibration for two camera modules based on an IR image to enhance the image processing reliability for two real images.

Specifically, when the surroundings are bright, two real images are clear so that the image processing reliability thereof is high. In contrast, when the surroundings are dark, two real images are not clear so that the image processing reliability thereof is not high. In order to solve this problem, in the exemplary embodiment, the image processing reliability for two real images can be improved by the camera calibration module 170.

That is, when the surroundings are dark, the camera calibration module 170 performs the camera calibration for two camera modules, that is, the stereoscopic camera using the IR image photographed by the IR camera module so that the sharpness of two real images is enhanced to improve the image processing reliability thereof.

The lighting sensing module 180 detects a lighting location within a predetermined radius from the current location. Further, the lighting sensing module 180 may further detect a luminous intensity of each lighting for every lighting location. That is, the lighting sensing module 180 may detect the lighting location in the surroundings of the user and the luminous intensity of the lighting for every lighting location. The detected lighting location and luminous intensity may be used to assign a shadow effect to the virtual image.

The microphone module 185 may detect sound generated within a predetermined radius from the current location. That is, the microphone module 185 may detect the sound generated in the surroundings of the user. In this case, a plurality of microphone modules 185 may be provided and in this case, the plurality of microphone modules 185 may have individual oriented angles of direction. The detected sound may be transmitted to the other party (a predetermined sound transmitting target, for example, a HMD of the other party at the time of conference call) through a communication module (not illustrated).

The spatial sense generation module 190 may generate direction data for every lighting with respect to the current location, based on the detected lighting location. Therefore, the computer may assign a shadow effect (shadow) to the object in the virtual image based on the generated direction data. When the shadow effect is assigned, the computer may adjust a shading depth of the object in the virtual image based on the detected luminous intensity.

When a plurality of microphone modules 185 is provided, the spatial sense generation module 190 may generate direction data of the sound detected by the plurality of microphone modules 185, based on the oriented angle of direction of the plurality of microphone modules 185. The generated direction data may be transmitted to the sound transmitting target together with the detected sound.

The control unit 195 may entirely control the three-dimensional information augmented video see-through display device 100 according to an exemplary embodiment of the present disclosure, that is, operations of the camera module 110, the camera interface module 120, the rectification module 130, the lens distortion correction module 140, the image generation module 150, the display module 160, the camera calibration module 170, the lighting sensing module 180, the microphone module 185, and the spatial sense generation module 190.

The control unit 195 may include at least one of the camera interface module 120, the rectification module 130, the lens distortion correction module 140, and the image generation module 150 and may be implemented by one or more hardware chips.

Figure 7:
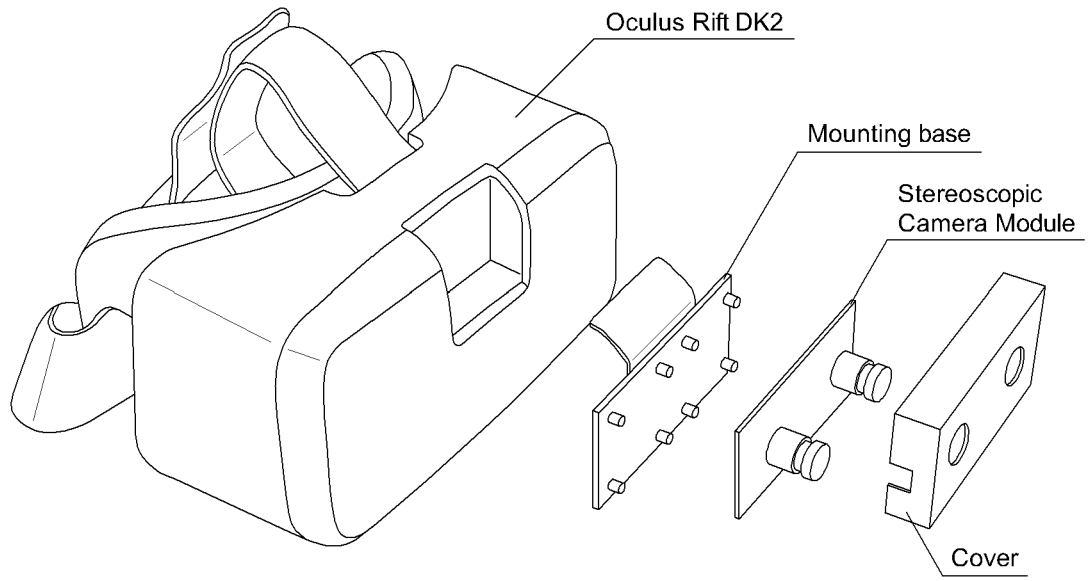
FIG. 7 is a view illustrating a structure in which a three-dimensional information augmented video see-through display device according to an exemplary embodiment of the present disclosure is detachably coupled to a display device.

In the meantime, the three-dimensional information augmented video see-through display device 100 according to the exemplary embodiment of the present disclosure may be coupled to a plurality of various display devices. Here, the display devices may include all of various existing video see-through based display devices including a glass-type display device. Therefore, the three-dimensional information augmented video see-through display device 100 may be detachably coupled to the display device. For example, as illustrated in FIG. 7, the three-dimensional information augmented video see-through display device (stereoscopic camera module) 100 may be detachably coupled to various display devices such that a mounting base is detachably fastened to an oculus in a state when the mounting base and a cover are coupled to a front side and a rear side of the stereoscopic camera module, respectively.

FIG. 2 is a view for explaining an operation of a three-dimensional information augmented video see-through display device according to an exemplary embodiment of the present disclosure.

Referring to FIG. 2, the camera interface module 120 selects an interface appropriate for two left and right camera modules 110, that is, CAM CON(L) and CAM CON(R), through the interface selection module 210 and converts two real images photographed by CAM CON(L) and CAM CON(R) into a format for image processing, by the color space conversion module 220.

In this case, the camera interface module 120 selects an interface suitable for CAM CON(C) which is one center camera module 110 through the interface selection module 210 and converts an image photographed by CAM CON(C) into a format for image processing by the color space conversion module 220. Here, CAM CON(C) may be an IR camera module which photographs an IR image and the camera calibration module 170 performs the camera calibration using the IR image to improve the image processing reliability of two real images.

The image which passes through the camera interface module 120 is input to the rectification module 130 and the rectification module 130 performs rectification on two real images. An image (rectified image) 230 which passes through the rectification module 130 is transmitted to the PC 250 and the PC 250 generates a virtual image which is a graphic image to be coupled to the rectified image 230. The rectified image 230 is coupled to a virtual image (rendered image) 260 from the PC 250 to be input to the lens distortion correction module 140. In the exemplary embodiment, an image obtained by combining the rectified image 230 and the virtual image (rendered image) 260 is defined as a composite image. Therefore, two composite images are input to the lens distortion correction module 140.

An opposite distortion is applied to the two composite images by the lens distortion correction module 140 to be corrected as an image which is the same as or similar to the real and then the two composite images are input to the image generation module 150. The two composite images are side-by-side processed by the image generation module 150 to be converted into one three-dimensional image. The three-dimensional image is displayed on a screen through a display module (Oculus Rift/HMD display) 160 and thus the user may view the three-dimensional image for virtual reality (VR) or augmented reality (AR) through the screen of the Oculus Rift or the HMD.

In the meantime, the PC 250 receives the luminous intensity and the direction data for every lighting at the surroundings through the lighting sensing module 180 and the spatial sense generation module 190 to assign a shadow effect (shadow) to an object in the virtual image. In this case, the depth of the shadow can be adjusted. The virtual image 260 with the shadow effect is combined with the rectified image 230 to be input to the lens distortion correction module 140.

Further, the PC 250 receives the surrounding sound through the microphone module 185 and the spatial sense generation module 190 to transmit the sound to the other party through a network. In this case, the PC 250 receives direction data of the sound detected by a plurality of microphone modules 185 through the spatial sense generation module 190 to transmit the direction data to the other party through a network. By doing this, the other party directly hears the sound around the user and feels the feeling of liveliness through the directivity of the sound.

Figure 3:
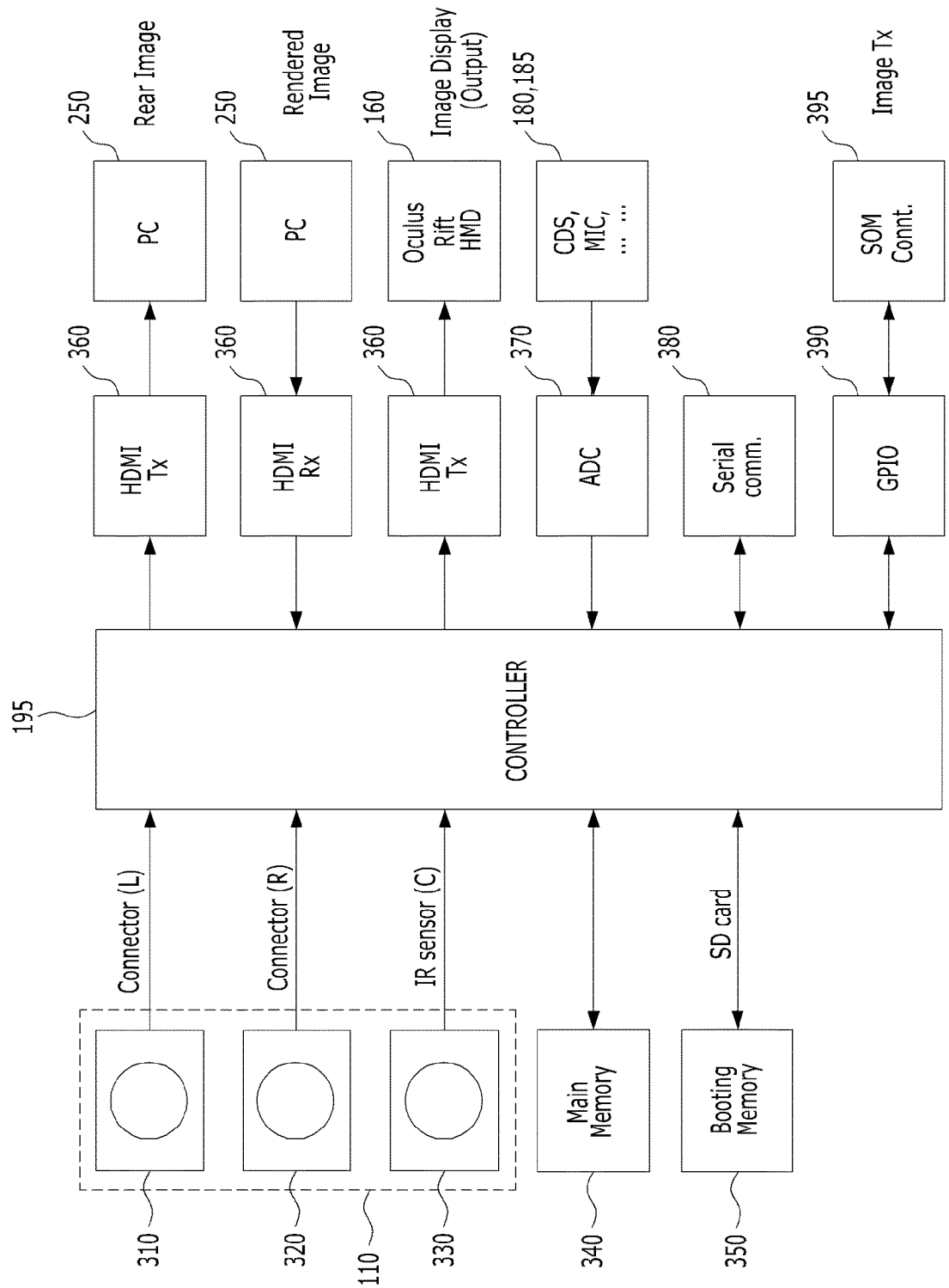
FIG. 3 is a PCB block diagram illustrating a connection state between a control unit and peripheral devices of a three-dimensional information augmented video see-through display device according to an exemplary embodiment of the present disclosure.

FIG. 3 is a PCB block diagram illustrating a connection state between a control unit and peripheral devices of a three-dimensional information augmented video see-through display device according to an exemplary embodiment of the present disclosure.

Referring to FIG. 3, the control unit 195 may be implemented by a field programmable gate array (FPGA). Three camera modules 110 may be connected to the control unit 195 and two camera modules (connector(L) and connector (R)) 310 and 320 among them are stereoscopic camera modules and the remaining one camera module (IR sensor (C)) 330 is an IR camera module.

Two main memories (for example, may be implemented by DDR3) 340 which are memories for image processing are connected to the control unit 195 and a booting memory 350 which is an OS processing memory with stored data for initializing the FPGA may be connected to the control unit 195. The booting memory 350 may be implemented by an SD card.

An HDMI 360 which is an input/output interface to transmit a real image to the PC 250 or receive a virtual image from the PC 250 may be connected to the control unit 195. In this case, the HDMI 360 may also serve as an input/output interface for transmitting a three-dimensional image to the Oculus Rift/HMD to display a three-dimensional image. Here, the HDMI 360 may be replaced by a wireless module which transmits high resolution images and audio at a close range at real time.

An ADC 170 which serves to convert analog sensing data detected by the lighting sensing module CDS 180 and the microphone module MIC 185 into digital data may be connected to the control unit 195. Further, a serial communication module 380 for data initialization (input at the time of setting a keyboard) may be connected to the control unit 195. Further, a general purpose input/output (GPIO) 390 and SOM Connt. 395 may be connected to the control unit 195 as selectable options.

Figure 4:
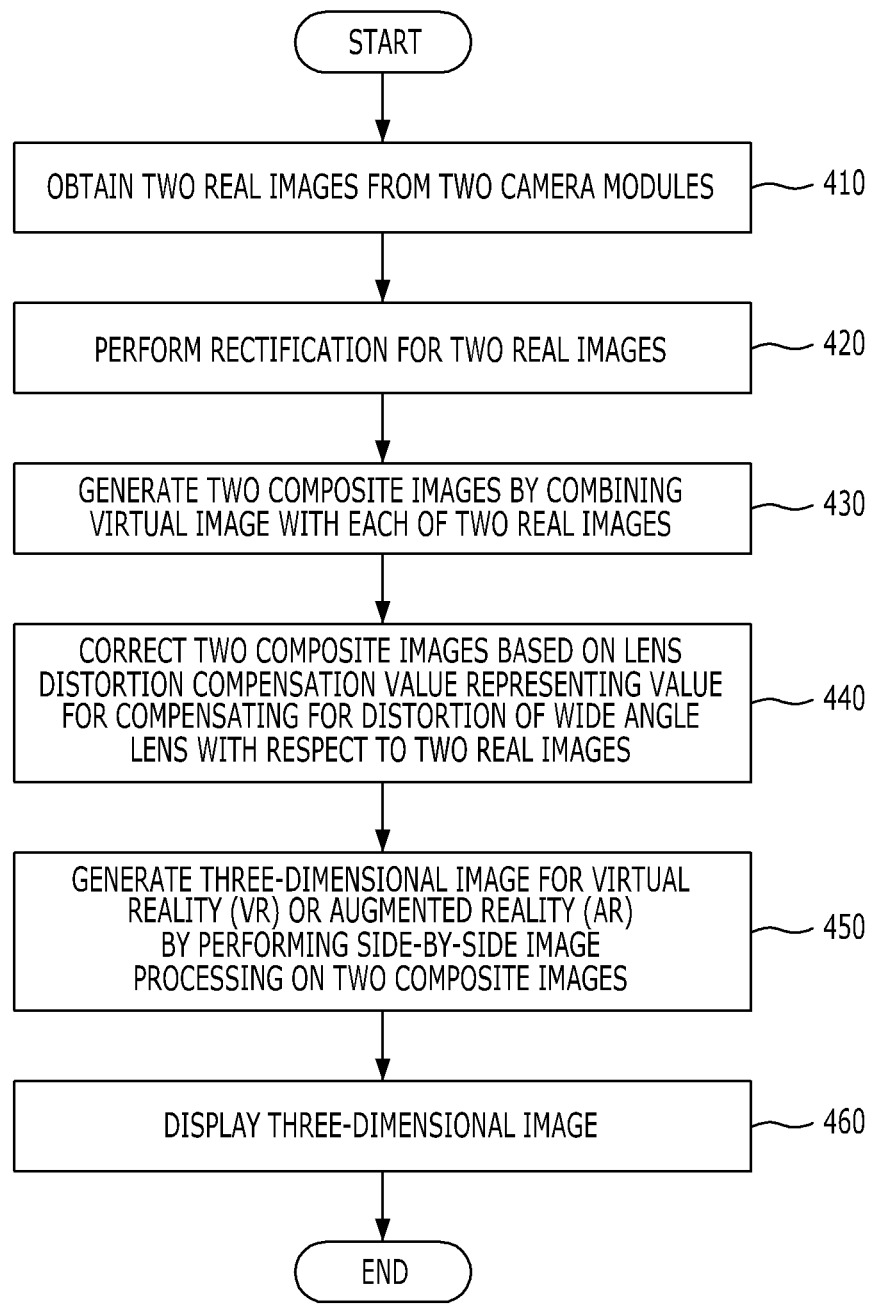
FIGS. 4 to 6 are flowcharts for explaining a three-dimensional information augmented video see-through display method according to an exemplary embodiment of the present disclosure.
Figure 5:
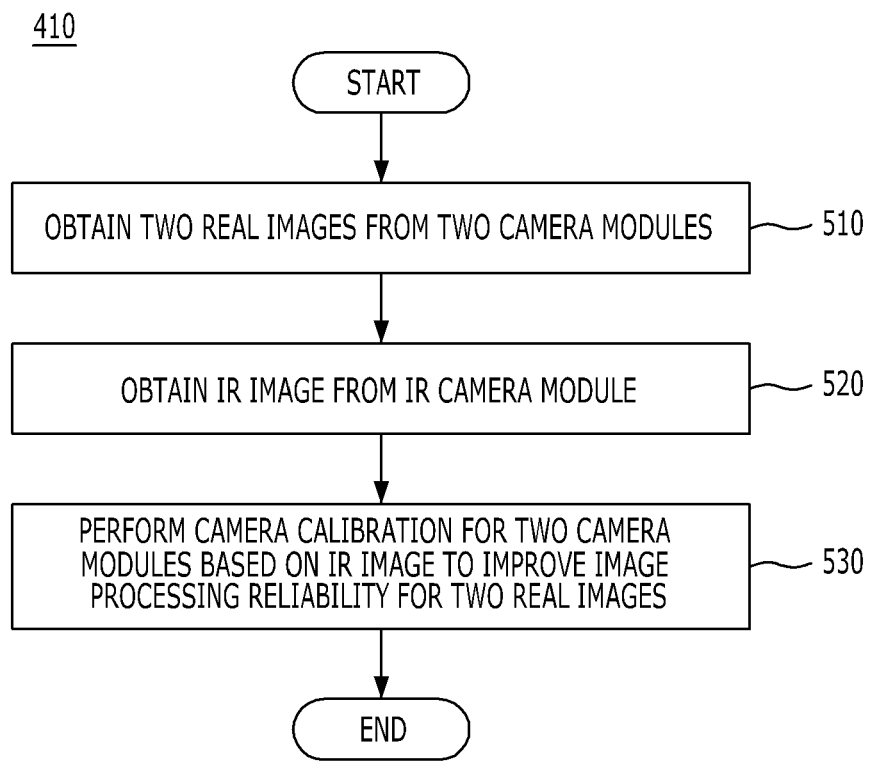
Figure 6:
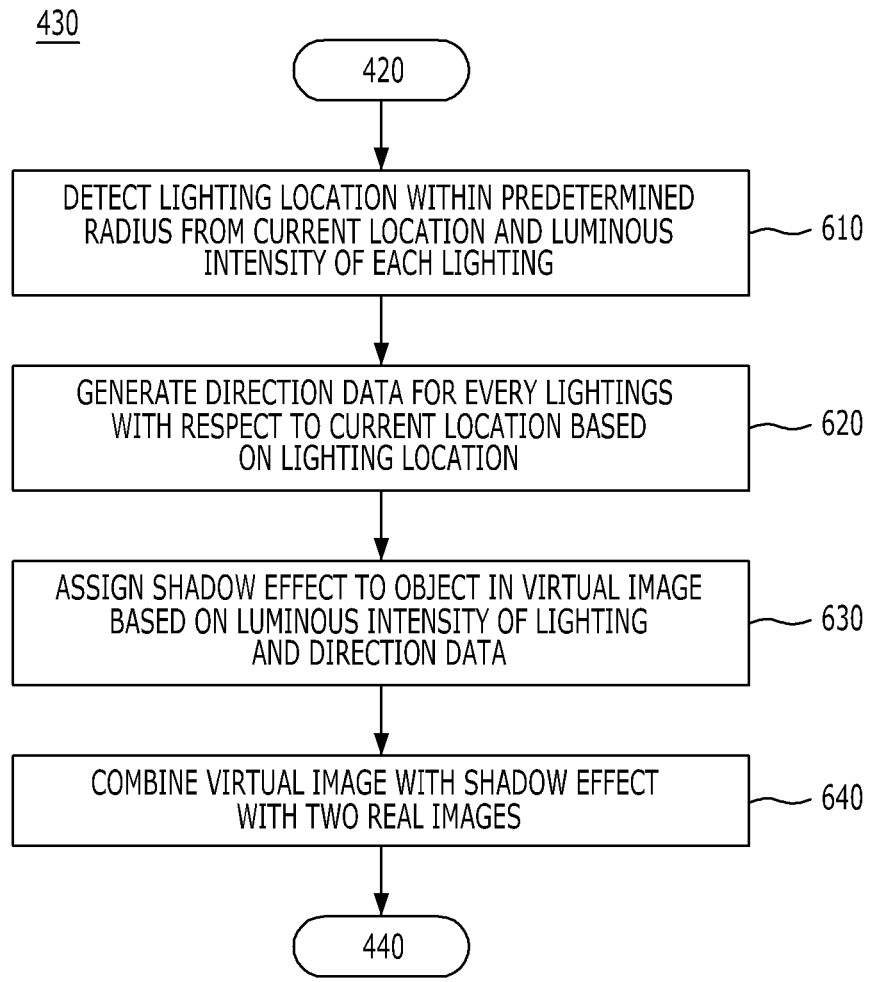

FIGS. 4 to 6 are flowcharts for explaining a three-dimensional information augmented video see-through display method according to an exemplary embodiment of the present disclosure.

Referring to FIGS. 4 to 6, in step 410, a three-dimensional information augmented video see-through display device obtains two real images from two camera modules.

In this case, after obtaining two real images from two camera modules in step 510, the three-dimensional information augmented video see-through display device obtains an IR image from an IR camera module in step 520 and then performs camera calibration for two camera modules based on the IR image to enhance the image processing reliability for two real images.

Next, in step 420, the three-dimensional information augmented video see-through display device performs rectification on the two real images.

In this case, the step 420 will be described in more detail below with reference to FIGS. 8 to 14 and a redundant description will be omitted.

Next, in step 430, the three-dimensional information augmented video see-through display device combines virtual images to the two real images to generate two composite images.

In this case, after detecting a lighting location within a predetermined radius from the current location and a luminous intensity of each lighting in step 610, the three-dimensional information augmented video see-through display device generates direction data for every lighting with respect to the current location based on the detected lighting location in step 620 and then assigns a shadow effect to an object in the virtual image based on the luminous intensity of each lighting and the direction data for every lighting in step 630. Next, the three-dimensional information augmented video see-through display device may combine the virtual image with the shadow effect to the two real images in step 640.

Next, in step 440, the three-dimensional information augmented video see-through display device corrects the two composite images, based on a lens distortion compensation value representing a value for compensating for distortion of a wide angle lens for two real images.

Next, in step 450, the three-dimensional information augmented video see-through display device performs side-by-side image processing on the two composite images to generate a three-dimensional image for virtual reality VR or augmented reality AR.

Next, in step 460, a display device to which the three-dimensional information augmented video see-through display device is detachably attached displays the generated three-dimensional image.

Now, a rectification module 130 of the three-dimensional information augmented video see-through display device 100 and a step 420 of a three-dimensional information augmented video see-through display method will be described with reference to FIGS. 8 to 14.

Figure 8:
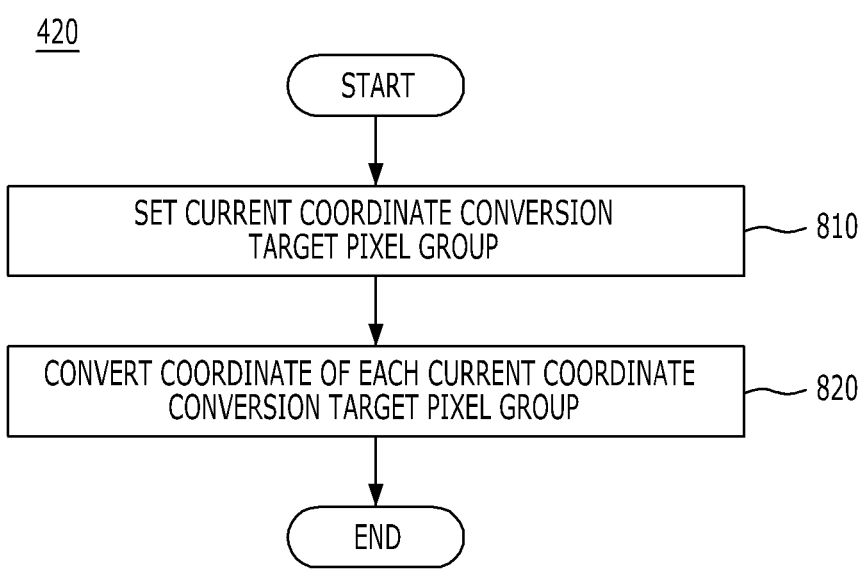
FIG. 8 is a flowchart for explaining a step of performing rectification of a three-dimensional information augmented video see-through display method according to an exemplary embodiment of the present disclosure.

FIG. 8 is a flowchart for explaining a step of performing rectification of a three-dimensional information augmented video see-through display method according to an exemplary embodiment of the present disclosure.

As illustrated in FIG. 8, the step 420 of performing rectification on two real images may include a step 810 of determining a current coordinate conversion target pixel group and a step 820 of converting a coordinate of the current coordinate conversion target pixel group.

The step 810 may refer to a step of determining a current coordinate conversion target pixel group configured by at least one consecutive pixel requiring the same coordinate conversion, among a plurality of pixels included in at least two real images, based on current reference target break point information on a previously stored break point look-up table.

For example, when the rectification is performed in step 810, the same coordinate conversion may be required for some pixels among consecutive pixels of two real images.

For example, if a total of eight pixels are consecutive with each other and coordinates of a first pixel, a second pixel, and a third pixel are required to be converted by +1 in an X-axis direction and coordinates of a fourth pixel, a fifth pixel, a sixth pixel, a seventh pixel, and an eighth pixel are required to be converted by +3 in an X-axis direction, the first to third pixels may refer to a current coordinate conversion target pixel group of consecutive pixels requiring the same coordinate conversion and the fourth to eighth pixels may refer to a next coordinate conversion target pixel group of consecutive pixels requiring the same coordinate conversion.

In this case, information storing pixels, among consecutive pixels, which require the same coordinate conversion may be defined as break point information. Specifically, break point information for determining the current coordinate conversion target pixel group may be determined as current reference target break point information.

A plurality of break point information for distinguishing consecutive pixels requiring the same coordinate conversion, among the plurality of pixels included in two real images may be stored on a break point look-up table.

Now, a break point look-up table of the related art which is applied in a rectification algorithm utilizing a break point look-up table of the related art will be described with reference to FIGS. 9A and 9B.

FIGS. 9A and 9B are views for explaining a break point look-up table utilized in a rectification algorithm of the related art.

As illustrated in FIGS. 9A and 9B, the break point look-up table of the related art may be separately stored in an X-axis direction and a Y-axis direction.

In this case, as illustrated in FIGS. 9A and 9B, the break point look-up table refers to a table which stores the corresponding break point information when there is corresponding break point information for every address which is allocated in advance on an internal memory and sets the corresponding address to be empty when there is no corresponding break point information.

In this case, the break point information may refer to "00000", "00000", "01002", "00001", "00802", "00803", "00002", "01003", and "00001" illustrated in FIG. 9A and "00000", "00004", "04001", "04802", "01803", and "00004" illustrated in FIG. 9B.

That is, in the break point look-up table of the related art, when there is no break point information corresponding to a previously allocated address, a wasted memory may be generated.

Now, a break point look-up table utilized in a step of performing rectification of a three-dimensional information augmented video see-through display method according to an exemplary embodiment of the present disclosure will be described with reference to FIGS. 10A and 10B.

FIGS. 10A and 10B are views for explaining a break point look-up table utilized in a step of performing rectification of a three-dimensional information augmented video see-through display method according to an exemplary embodiment of the present disclosure.

As illustrated in FIGS. 10A and 10B, a break point look-up table utilized in a step of performing rectification of the three-dimensional information augmented video see-through display method according to an exemplary embodiment of the present disclosure may be separately stored in an X-axis direction and a Y-axis direction, similarly to the break point look-up table of the related art.

In this case, the break point look-up table utilized in the step 420 of the present disclosure may refer to a table which sequentially stores a plurality of break point information in an empty space on an internal memory as illustrated in FIGS. 10A and 10B and separately stores storage address information on at least one memory for at least one break point information among the plurality of break point information as illustrated in boxes of FIGS. 10A and 10B.

As a result, the break point look-up table utilized in the step 420 of the present disclosure stores the break point information without having a wasted memory on the internal memory so that the storage space of the internal memory can be efficiently utilized.

Now, simultaneously referring to FIGS. 9A and 10A, the break point look-up table of the related art and the break point look-up table utilized in the step 420 are compared with each other.

Storage address information of "00000" which is break point information of an m+5-th column of FIG. 9A is defined as "0", storage address information of "00000" which is first break point information of an m+10-th column is defined as "1", storage address information of "01002" which is second break point information of the m+10-th column is defined as "2", storage address information of "00001" which is first break point information of an m+15-th column is defined as "3", storage address information of "00802" which is second break point information of the m+15-th column is defined as "4", storage address information of "00803" which is third break point information of the m+15-th column is defined as "5", storage address information of "00002" which is first break point information of an m+20-th column is defined as "6", storage address information of "01003" which is second break point information of the m+20-th column is defined as "7", and storage address information of "00001" which is break point information of an m+25-th column is defined as "8".

In this case, in the break point look-up table utilized in the step 420 of the present disclosure illustrated in FIG. 10A, after sequentially storing "00000", "00000", "01002", "00001", "00802", "00803", "00002", "01003", and "00001" which are break point information, "0", "1," "3", "6", and "8" which are storage address information corresponding to initial break point information for each row illustrated in FIG. 9A are separately stored.

Similarly, when storage address information of "00000" which is break point information of an n+5-th row illustrated in FIG. 9B is defined as "0", storage address information of "00004" which is first break point information of an n+10-th row is defined as "1", and storage address information of "00004" which is first break point information of an n+15-th row is defined as "5", in the break point look-up table utilized in the step 420 of the present disclosure illustrated in FIG. 10B, after sequentially storing "00000", "00004", "04001", "04802", "01803", "and "00004" which are break point information, "0", "1," and "5" which are storage address information corresponding to initial break point information for each row illustrated in FIG. 9B are separately stored.

In other words, the previously stored break point look-up table sequentially stores the plurality of break point information in an empty space on the memory and further stores storage address information on at least one memory for at least one break point information among the plurality of sequentially stored break point information.

Referring to FIG. 8 again, a step 820 of converting a coordinate of the current coordinate conversion target pixel group will be described.

The step 820 may refer to a step of converting the coordinate of the current coordinate conversion target pixel group based on current coordinate conversion information including a current differential value which is a differential value from the current target coordinate which is a coordinate to which the current coordinate conversion target pixel group is converted.

For example, in the step 820, when a coordinate of a first pixel included in the current coordinate conversion target pixel group is (1,0), a coordinate of a second pixel is (2,0), and a coordinate of a third pixel is (1,1) and a current target coordinate of the first pixel is (1,1), a current target coordinate of the second pixel is (2,1), and a current target coordinate of the third pixel is (3,1), a current differential value included in the current coordinate conversion information may be +1 in the y-axis direction.

Now, the current coordinate conversion information will be described with reference to FIGS. 11A and 11B.

FIGS. 11A and 11B are views for explaining current coordinate conversion information utilized in a step of performing rectification of a three-dimensional information augmented video see-through display method according to an exemplary embodiment of the present disclosure.

For example, as illustrated in FIGS. 11A and 11B, even though it will be described that the current coordinate conversion information is data configured by 18 bits in the X-axis direction and the Y-axis direction, the current coordinate conversion information of the present disclosure is not limited to 18 bits data.

As illustrated in FIG. 11A, the current coordinate conversion information for the X-axis direction may include a double target field including a predetermined number of bits, a differential field including a predetermined number of bits, and a row number field including a predetermined number of bits.

According to an exemplary embodiment, the double target field is a field indicating a surrounding pixel for interpolating a pixel value to be emptied when at least two pixels among pixels included in the current coordinate conversion pixel group are mapped to the same current target coordinate and includes a total of three bits.

According to an exemplary embodiment, the differential field may refer to a field indicating a differential value between a current target coordinate to which the current coordinate conversion target pixel group is converted and the current coordinate conversion target pixel group.

For example, when at least two camera modules are fish-eye cameras, the differential field indicating a current differential value may include at least four bits.

The reason is that when a fish-eye lens which is a sort of a wide angle lens is utilized, the distortion caused by the lens is larger than that of a general lens. Further, when the differential field includes a total of four bits, the differential field may store differential values from −8 to +7 so that the coordinate conversion for the current coordinate conversion target pixel group may be performed in the broader range.

For example, the row number field is a field for storing coordinate information of pixels included in the current coordinate conversion target pixel group and includes a total of 11 bits.

As illustrated in FIG. 11B, the current coordinate conversion information for the Y-axis direction may include a consecutive information field including a predetermined number of bits, a differential field including a predetermined number of bits, and a column number field including a predetermined number of bits.

In this case, the description for the differential field and the column number field is the same as described in FIG. 11A so that a redundant description will be omitted.

For example, the consecutive information field is a field of previously storing a different value between a next differential value which is a differential value from a next target coordinate to which a next coordinate conversion target pixel group on which coordinate conversion is performed next to the current coordinate conversion target pixel group is converted and a current differential value which is a differential value from a current target coordinate to which the current coordinate conversion target pixel group is converted.

For example, when the current differential value for the current coordinate conversion target pixel group is +5 in the X-axis direction and the next differential value for the next coordinate conversion target pixel group is +4 in the X-axis direction, the consecutive information field may previously store a different value "−1" between the current differential value "+5" and the next differential value "+4".

That is, information indicating that the next differential value of the next coordinate conversion target pixel group is smaller by 1 in the X-axis direction than the current differential value of the current coordinate conversion target pixel group may be stored in advance in the current coordinate conversion information.

As a result, since the coordinate conversion of the next coordinate conversion target pixel group may be performed based on the different value between the current differential value of the current coordinate conversion target pixel group and the next differential value of the next coordinate conversion target pixel group without repeatedly accessing the memory, there is an advantage in that the operation speed is shortened.

In other words, the current coordinate conversion information may previously store the different value between the next differential value which is a differential value from the next target coordinate which is a coordinate to which the next coordinate conversion target pixel group previously determined based on the next reference target break point information on the previously stored break point look-up table is converted and the current differential value.

As a result, in the step 420, the rectification module 130 may convert the coordinate of each of the next coordinate conversion target pixel groups based on the different value between the next differential value and the current differential value.

The double target field will now be described with reference to FIG. 12.

FIG. 12 is a view for explaining a double target field among current coordinate conversion information utilized in a step of performing rectification of a three-dimensional information augmented video see-through display method according to an exemplary embodiment of the present disclosure.

As illustrated in FIG. 12, when bit values of three bits of the double target field are 0,0,0, it means that there is no empty pixel (no double target) and when the bit values are 0,0,1, it means that pixel values of the empty pixel are stored as up forward pixel values. Further, when the bit values are 0,1,0, it means that pixel values of the empty pixel are stored as up pixel values, when the bit values are 0,1,1, it means that pixel values of the empty pixel are stored as up backward pixel values, when the bit values are 1,0,0, it means that pixel values of the empty pixel are stored as below forward pixel values, when the bit values are 1,0,1, it means that pixel values of the empty pixel are stored as below pixel values, and when the bit values are 1,1,0, it means that pixel values of the empty pixel are stored as below backward pixel values.

The differential field will now be described with reference to FIG. 13.

FIG. 13 is a view for explaining a differential field among current coordinate conversion information utilized in a step of performing rectification of a three-dimensional information augmented video see-through display method according to an exemplary embodiment of the present disclosure.

As illustrated in FIG. 13, when the differential field includes a total of four bits, the differential field may store the current differential value which is a differential value of the current target coordinate which is a coordinate to which the current coordinate conversion target pixel group is converted and a coordinate of the current coordinate conversion target pixel group in the range of −8 to 7.

For example, when bit values of the differential field for the X-axis are 1,0,0,1, it means that the coordinate of each of the plurality of pixels included in the current coordinate conversion target pixel group needs to be converted by −2 in the X-axis direction.

In this case, −2 corresponding to 1,0,0,1 may refer to the current differential value.

The consecutive information field will now be described with reference to FIG. 14.

FIG. 14 is a view for explaining a consecutive information field which defines a next target coordinate, among current coordinate conversion information utilized in a step of performing rectification of a three-dimensional information augmented video see-through display method according to an exemplary embodiment of the present disclosure.

As illustrated in FIG. 14, the consecutive information field may previously store the different value between the current differential value for the current coordinate conversion target pixel group and the next differential value for the next coordinate conversion target pixel group.

For example, when the consecutive information field includes a total of three bits, one bit means a flag field and the remaining two bits mean different value fields.

In this case, a first bit of the different value field refers to a sign bit and a second bit refers to an absolute value of the different value.

As a result, when the consecutive information field includes a total of three bits, a different value between the current differential value and the next differential value may be stored as one of −1, 0, and 1 and in this case, the flag field may have a value "1".

In this case, when the different value between the current differential value and the next differential value is one of −1, 0, and 1, the coordinate conversion of the next coordinate conversion target pixel group is allowed without accessing the memory and when the different value between the current differential value and the next differential value is smaller than −1 or larger than +1, the coordinate conversion of the next coordinate conversion target pixel group needs to be performed by accessing the memory again.

Similarly, even though not illustrated in the drawing, when the consecutive information field includes a total of five bits, except for one bit of a flag field and one bit of a sign bit, a total of three bits remains. In this case, as the different values of the current differential value and the next differential value, a total of 15 different values including −7, −6, −5, −4, −3, −2, −1, 0, 1, 2, 3, 4, 5, 6, 7 is stored in the consecutive information field. As a result, when the different value of the current differential value and the next differential value is in the range of −7 to +7, the coordinate conversion of the next coordinate conversion target pixel group is allowed without accessing the memory and only when the different value of the current differential value and the next differential value is smaller than −7 or larger than +7, the coordinate conversion of the next coordinate conversion target pixel group is performed by accessing the memory again.

According to an exemplary embodiment, the lens distortion correction module 140 may compensate for the lens distortion by utilizing the same algorithm as the above-described rectification module 130.

In this case, the lens distortion correction module 140 determines current coordinate conversion target pixel groups configured by at least one consecutive pixel requiring the same coordinate conversion, among a plurality of pixels included in at least two rectified real images, based on current reference target lens distortion compensation break point information on a previously stored lens distortion compensation break point look-up table and converts coordinates of the current coordinate conversion target pixel groups based on the current coordinate conversion information including a current differential value which is a differential value from the current target coordinate which is a coordinate to which the current coordinate conversion target pixel group is converted.

In this case, the previously stored lens distortion compensation break point look-up table sequentially stores the plurality of lens distortion compensation break point information in an empty space on the memory and further stores storage address information on at least one memory for at least one lens distortion compensation break point information among the plurality of sequentially stored lens distortion compensation break point information.

In this case, the current coordinate conversion information may previously store the different value between the next differential value which is a differential value from the next target coordinate which is a coordinate to which the next coordinate conversion target pixel group previously determined based on the next reference target lens distortion compensation break point information on the previously stored lens distortion compensation break point look-up table is converted and the current differential value.

As a result, the lens distortion correction module 140 may convert the coordinate of each of the next coordinate conversion target pixel groups based on the different value between the next differential value and the current differential value.

A rectification apparatus (not illustrated) according to an exemplary embodiment of the present disclosure will now be described.

Here, the rectification apparatus (not illustrated) according to an exemplary embodiment of the present disclosure may refer to an apparatus only including the camera interface module 120 and the rectification module 130 in the three-dimensional information augmented video see-through display device 100 illustrated in FIG. 1.

For example, the rectification apparatus (not illustrated) according to an exemplary embodiment of the present disclosure may include the camera interface module 120 which obtains at least two real images from at least two camera modules and the rectification module 130 which performs rectification on at least two real images.

In this case, the rectification module 130 determines current coordinate conversion target pixel groups configured by at least one consecutive pixel requiring the same coordinate conversion, among a plurality of pixels included in at least two real images, based on current reference target break point information on a previously stored break point look-up table and converts coordinates of the current coordinate conversion target pixel groups based on the current coordinate conversion information including a differential value from the current target coordinate which is a coordinate to which the current coordinate conversion target pixel group is converted.

In this case, the description of components of the rectification apparatus (not illustrated) according to the exemplary embodiment of the present disclosure is the same as described in FIGS. 1 to 14, so that the redundant description will be omitted.

Exemplary embodiments of the present disclosure include a computer readable medium which includes a program command to perform an operation implemented by various computers. The computer readable medium may include solely a program command, a local data file, and a local data structure or a combination thereof. The medium may be specifically designed or constructed for the present disclosure or known to those skilled in the art of a computer software to be used. Examples of the computer readable recording medium include magnetic media such as a hard disk, a floppy disk, or a magnetic tape, optical media such as a CD-ROM or a DVD, magneto-optical media such as a floptical disk, and a hardware device which is specifically configured to store and execute the program command such as a ROM, a RAM, and a flash memory. Examples of the program command include not only a machine language code which is created by a compiler but also a high level language code which may be executed by a computer using an interpreter.

Although the specific exemplary embodiment of the present disclosure has been described, it should be understood that various modification may be allowed without departing from the scope of the present disclosure. Therefore, the scope of the present disclosure should not be defined by being limited to the embodiments described, but should be defined by the claims to be described below and those equivalent to the claims.

As described above, although the present disclosure has been described by limited embodiments and drawings, the present disclosure is not limited to the embodiments, and it will be apparent to those skilled in the art to which the present disclosure pertains that various modifications and variations may be made from the description. Therefore, the spirit of the present disclosure needs to be interpreted by the appended claims and all equivalent modifications are included within the spirit of the present disclosure.

What is claimed is:

1. A three-dimensional information augmented video see-through display device, comprising:
   a camera interface module which obtains at least two real images from at least two camera modules;
   a rectification module which performs rectification on the at least two real images;
   a lens distortion correction module which corrects at least two composite images obtained by combining a virtual image to the at least two real images, based on a lens distortion compensation value indicating a value for compensating for a distortion of a wide angle lens for the at least two real images; and
   an image generation module which performs side-by-side image processing on the at least two composite images to generate a three-dimensional image for virtually reality VR or augmented reality AR,
   wherein the rectification module performs rectification to change the two real images which are photographed from the at least two camera modules, based on adjusting an epipolar geometry through a field programable gate array FPGA module to make an optical axis and a reference point be parallel and intersect at infinity.

2. The three-dimensional information augmented video see-through display device according to claim 1, wherein the rectification module determines a current coordinate conversion target pixel group configured by at least one consecutive pixel requiring the same coordinate conversion, among a plurality of pixels included in the at least two real images, based on current reference target break point information on a previously stored break point look-up table and converts the coordinate of the current coordinate conversion target pixel group based on current coordinate conversion information including a current differential value which is a differential value from the current target coordinate to which the current coordinate conversion target pixel group is converted.

3. The three-dimensional information augmented video see-through display device according to claim 2, wherein the previously stored break point look-up table sequentially stores a plurality of break point information in an empty space on the memory and further stores storage address information on at least one memory for at least one break point information among the plurality of sequentially stored break point information.

4. The three-dimensional information augmented video see-through display device according to claim 2, wherein the current coordinate conversion information previously stores the different value between the next differential value which is a differential value from the next target coordinate which is coordinate to which the next coordinate conversion target pixel group previously determined based on the next reference target break point information on the previously stored break point look-up table is converted and the current differential value.

5. The three-dimensional information augmented video see-through display device according to claim 4, wherein the rectification module converts the coordinate of the next coordinate conversion target pixel group based on a different value between the next differential value and the current differential value.

6. The three-dimensional information augmented video see-through display device according to claim 2, wherein when the at least two camera modules are fish-eye cameras, the differential field indicating the current differential value includes at least four bits.

7. The three-dimensional information augmented video see-through display device according to claim 1, further comprising:
the at least two camera modules which photograph the at least two real images;
an IR camera module which photographs an IR image; and
a camera calibration module which performs camera calibration for the at least two camera modules based on the IR image to enhance an image processing reliability for the at least two real images.

8. The three-dimensional information augmented video see-through display device according to claim 1, further comprising:
a lighting sensing module which detects a lighting location within a predetermined radius from a current location; and
a spatial sense generation module which generates direction data for every lighting with respect to the current location based on the detected lighting location,
wherein the virtual image is input from a computer interworking with the three-dimensional information augmented video see-through display device to be combined with the at least two real images and the computer assigns a shadow effect to an object in the virtual image based on the generated direction data.

9. The three-dimensional information augmented video see-through display device according to claim 8, wherein the lighting sensing module further detects a luminous intensity of each lighting for every lighting location and when the shadow effect is assigned, the computer adjusts a depth of the shadow of the object in the virtual image based on the detected luminous intensity.

10. The three-dimensional information augmented video see-through display device according to claim 1, further comprising:
a microphone module which detects a sound generated within a predetermined radius from the current location; and
a communication module which transmits the detected sound to a predetermined sound transmitting target.

11. The three-dimensional information augmented video see-through display device according to claim 10, further comprising:
a spatial sense generation module which generates direction data of the sound detected by a plurality of microphone modules, based on an oriented angle of direction of the plurality of microphone modules when the plurality of microphone modules is provided,
wherein the communication module further transmits the generated direction data to the sound transmitting target.

12. The three-dimensional information augmented video see-through display device according to claim 1, further comprising:
a lens distorting compensation look-up table which stores the lens distortion compensation value matched to each of a plurality of display devices,
wherein the lens distortion correction module corrects the at least two composite images using the lens distortion compensation look-up table.

13. The three-dimensional information augmented video see-through display device according to claim 1, wherein at least one of the camera interface module, the rectification module, the lens distortion correction module, and the image generation module is implemented by a hardware chip.

14. A three-dimensional information augmented video see-through display method, comprising:
obtaining at least two real images from at least two camera modules;
performing rectification on the at least two real images;
correcting at least two composite images obtained by combining a virtual image to the at least two real images, based on a lens distortion compensation value indicating a value for compensating for a distortion of a wide angle lens for at least two real images; and
performing side-by-side image processing on the two composting images to generate a three-dimensional image for virtual reality VR or augmented reality AR,
wherein the step of performing rectification comprises changing the two real images which are photographed from the at least two camera modules, based on adjusting an epipolar geometry through a field programmable gate array FPGA module to make an optical axis and a reference point be parallel and intersect at infinity.

15. The three-dimensional information augmented video see-through display method according to claim 14, wherein the performing of rectification includes:
determining a current coordinate conversion target pixel group configured by at least one consecutive pixel requiring the same coordinate conversion, among a plurality of pixels included in the at least two real images, based on current reference target break point information on a previously stored break point look-up table; and
converting the coordinate of the current coordinate conversion target pixel group based on current coordinate conversion information including a current differential value which is a differential value from the current target coordinate to which the current coordinate conversion target pixel group is converted.

16. The three-dimensional information augmented video see-through display method according to claim 15, wherein the current coordinate conversion information previously stores the different value between the next differential value which is a different value from the next target coordinate which is a coordinate to which the next coordinate conversion target pixel group previously determined based on the next reference target break point information on the previously stored break point look-up table is converted and the current differential value.

17. The three-dimensional information augmented video see-through display method according to claim 16, wherein the performing of rectification includes converting the coordinate of the next coordinate conversion target pixel group based on a different value between the next differential value and the current differential value.

18. The three-dimensional information augmented video see-through display method according to claim 14, further comprising:
   detecting a lighting location within a predetermined radius from a current location;
   generating direction data for every lighting with respect to the current location, based on the detected lighting location; and
   assigning a shadow effect to an object in the virtual image based on the generated direction data.

19. The three-dimensional information augmented video see-through display method according to claim 14, further comprising:
   storing the lens distortion compensation value corresponding to each of a plurality of display devices in a lens distortion compensation look-up table,
   wherein the correcting includes correcting the at least two composite images using the lens distorting compensation look-up table.

20. A rectification apparatus, comprising:
   a camera interface module which obtains at least two real images from at least two camera modules; and
   a rectification module which performs rectification on the at least two real images;
   wherein the rectification module determines a current coordinate conversion target pixel group configured by at least one consecutive pixel requiring the same coordinate conversion, among a plurality of pixels included in the at least two real images, based on current reference target break point information on a previously stored break point look-up table and converts the coordinate of the current coordinate conversion target pixel group based on current coordinate conversion information including a differential value from the current target coordinate to which the current coordinate conversion target pixel group is converted, and
   wherein the rectification module performs rectification to change the two real images which are photographed from the at least two camera modules, based on adjusting an epipolar geometry through a field programable gate array FPGA module to make an optical axis and a reference point be parallel and intersect at infinity.

* * * * *